July 31, 1934. E. LATSHAW Re. 19,259

BRAKING APPARATUS

Original Filed Dec. 19, 1930 2 Sheets-Sheet 1

Inventor:—
Elmer Latshaw
by his Attorneys
Howson & Howson

July 31, 1934. E. LATSHAW Re. 19,259

BRAKING APPARATUS

Original Filed Dec. 19, 1930 2 Sheets-Sheet 2

Inventor:—
Elmer Latshaw
by his Attorneys
Howson & Howson

Reissued July 31, 1934

Re. 19,259

UNITED STATES PATENT OFFICE 19,259

BRAKING APPARATUS

Elmer Latshaw, Philadelphia, Pa., assignor to The J. G. Brill Company, Philadelphia, Pa., a corporation of Pennsylvania Original No. 1,871,621, dated August 16, 1932, Serial No. 503,571, December 19, 1930. Application for reissue October 26, 1933, Serial No. 696,451

20 Claims. (Cl. 188—52)

This invention relates to braking apparatus for car trucks and more particularly to a braking means for use in car trucks of the type illustrated in my prior patent No. 1,831,714 issued November 10, 1931, for Car trucks.

An important object of the invention is to provide a construction disassociating the braking cylinder from the car frame proper and transferring the mounting of this cylinder to the truck frame, thus avoiding the use of long brake rods and avoiding the wear occurring as a result of constant variation in distance between the car frame to which the cylinder is ordinarily applied and the truck frame to which the brake levers are applied.

A further object of the invention is the provision of a construction compacting the braking mechanism to the greatest possible extent.

These and other objects I attain by the construction shown in the accompanying drawings wherein, for the purpose of illustration, I have shown a preferred embodiment of my invention and wherein.

Figure 1:
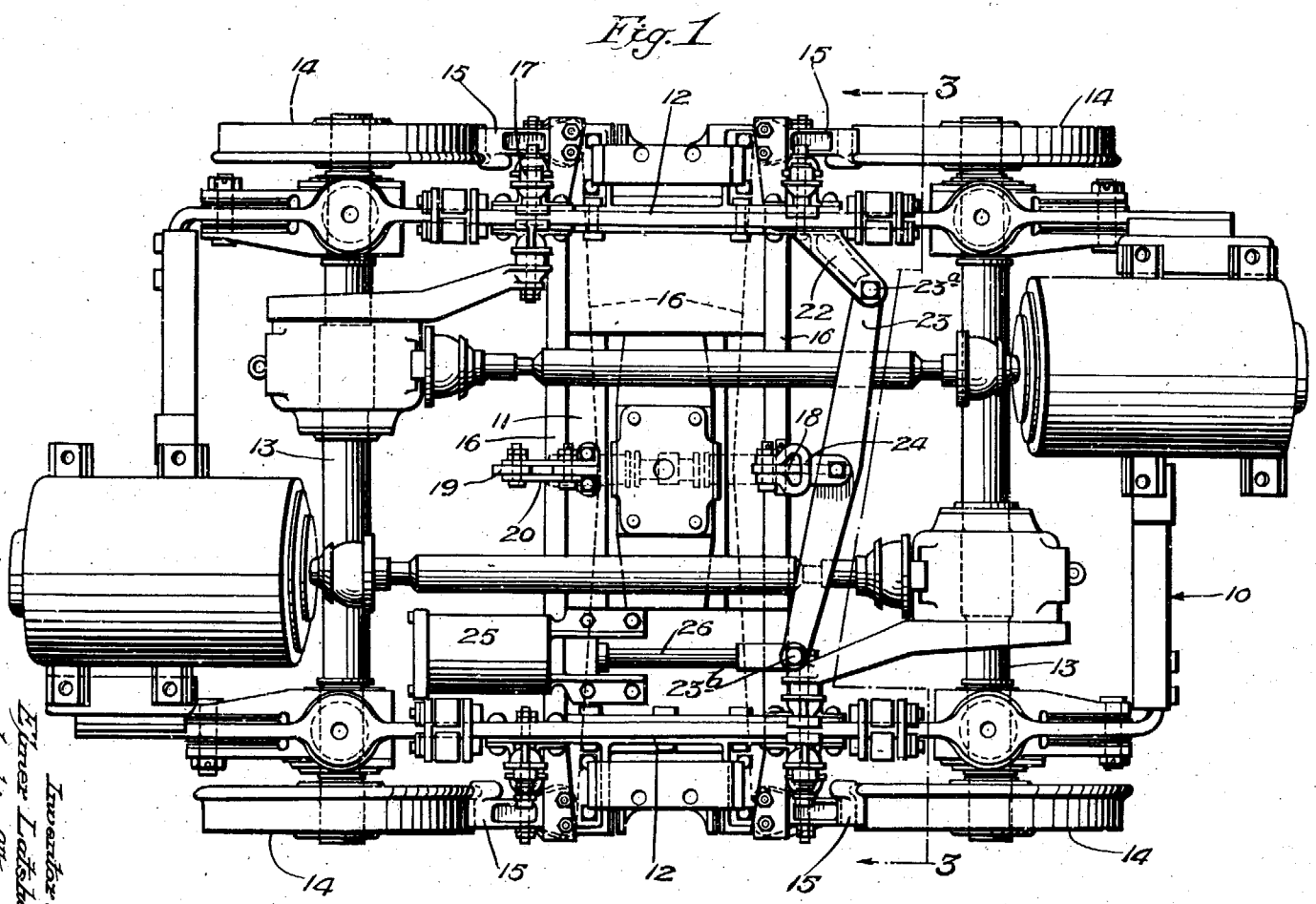
Fig. 1 is a plan view of a car truck embodying braking apparatus constructed in accordance with my invention.
Figure 2:
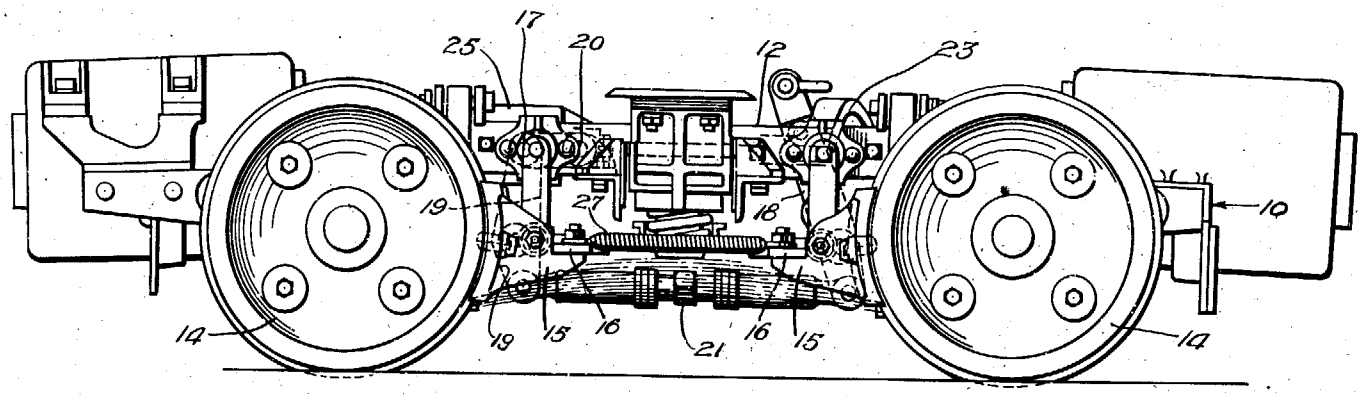
Fig. 2 is a side elevation thereof.
Figure 3:
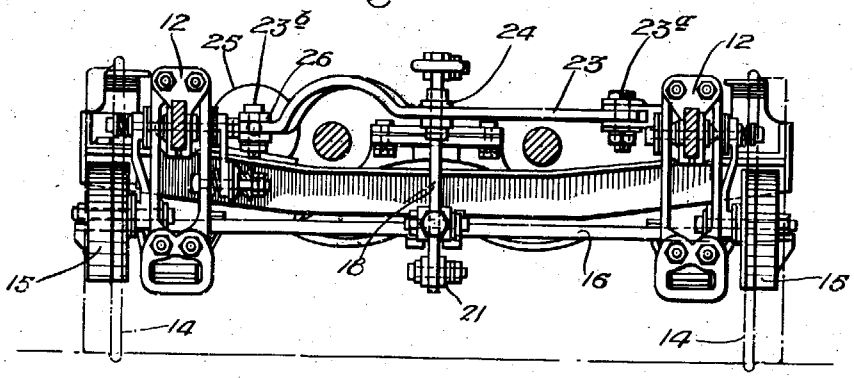
Fig. 3 is a section on line 3—3 of Fig. 1.

Referring now more particularly to the drawings, the truck illustrated in my prior patent, hereinbefore referred to, includes a frame generally designated at 10 and including a centrally disposed transversely directed member 11 connecting the side members 12 thereof. This frame is supported from the usual axles 13 bearing driving wheels 14 adjacent faces of which driving wheels at each side of the truck are engaged by brake shoes 15. The shoes of wheels of the same axle are connected by transversely-extending beams 16 the ends of these beams being supported by link mechanisms 17 depending from the side members 12 of the truck frame 10. To the outer edge of one of these beams a vertically disposed lever 18 is connected intermediate its ends while to the outer edge of the other of the beams a lever 19 is connected intermediate its ends, the upper end of lever 19 being connected to one side of the transversely-extending member 11 of the frame at its upper end by link mechanism 20. The lower ends of levers 18 and 19 are connected by a link 21 which may comprise the usual slack take-up mechanism if so desired. In accordance with my invention, I secure to one of the side members 12 a fixed bracket 22 to which I pivotally secure at 23*a* one end of a transversely-extending horizontal lever 23 which approaches the upper end of lever 18 and is centrally and pivotally link connected thereto as indicated at 24. At the opposite side of the truck frame I secure a longitudinally directed brake cylinder 25 the piston rod 26 of which is pivotally connected to the free end of transversely-extending lever 23 at 23*b*. It will be obvious that longitudinal movements of the rod 26 will cause oscillatory motion of brake lever 23 which through the levers 18, 19 and link 21, is transmitted to cause the longitudinal separation of brake beams 16 and a consequent application of the brakes. Springs 27 connecting the beams 16 tend to constantly move these beams toward one another so that upon release of air from the cylinders the brake shoes will move toward one another.

By use of a construction of this character the number of connections necessary is reduced and the wear upon these connections likewise reduced.

Since the arrangement employed is obviously capable of a certain range of change and modification without departing from the spirit of my invention, I do not wish to be understood as limiting myself thereto except as hereinafter claimed.

I claim:

1. In a car truck, a frame, a brake cylinder secured to the frame at one side thereof, a brake lever pivoted at one end to the frame adjacent the opposite side thereof and at its opposite end to the rod of the cylinder piston, and brake means operatively connected to said lever intermediate the ends thereof.

2. In a car truck, a frame, a longitudinally-extending brake cylinder secured to the frame adjacent one side thereof, a transversely-extending brake lever pivotally connected at one end to the rod of the cylinder piston and at its opposite end to the frame, and brakes operatively connected to said lever to be actuated thereby.

3. In a car truck, a frame, a longitudinally-extending brake cylinder secured to the frame adjacent one side thereof, a transversely-extending brake lever pivotally connected at one end to the rod of the cylinder piston and at its opposite end to the frame, a pair of transversely-extending brake beams, a pair of vertically-extending levers, one associated with each brake beam, each lever being connected to its associated beam at the outer edge of the beam and at a point spaced below the upper end of the lever, a link connection between the lower ends of the levers, a pivotal connection between the upper end of one lever and the frame and a pivotal connection between the upper end of the other lever and the transversely-extending lever at a point intermediate the ends of the transversely-extending lever.

4. In a car truck, a frame including spaced side members, a brake cylinder between said side members and secured to the frame adjacent one side member thereof, a transversely-extending brake lever fulcrumed to the frame, a pivotal connection between the rod of the brake cylinder and one end of said lever and brakes operatively connected to said lever to be actuated thereby.

5. In a brake arrangement, the combination of a truck frame including a side frame, a wheel disposed adjacent thereto, brake rigging cooperating for braking association with said wheel, operating means for operating said brake rigging, said operating means including a cylinder supported by said truck frame, and a cylinder lever connected intermediate the ends thereof to said brake rigging, said cylinder lever being pivotally mounted adjacent one end thereof on said side frame, and pivotally connected adjacent the other end thereof to the piston of said cylinder.

6. In a brake arrangement, the combination of a truck frame including a side frame, a wheel disposed adjacent thereto, brake rigging cooperating for braking association with said wheel, operating means for operating said brake rigging, said operating means including a cylinder supported by said truck frame, and a cylinder lever connected intermediate the ends thereof to said brake rigging, said cylinder lever being pivotally mounted adjacent one end thereof to a fixed pivot provided on said side frame, and pivotally connected adjacent the other end thereof to the piston of said cylinder.

7. In a brake arrangement, the combination of a truck frame including a side frame, a wheel disposed adjacent thereto, brake rigging cooperating for braking association with said wheel, operating means for operating said brake rigging, said operating means including a cylinder supported by said truck frame, and a substantially horizontally disposed cylinder lever connected intermediate the ends thereof to said brake rigging, said cylinder lever being pivotally mounted adjacent one end thereof on said side frame, and pivotally connected adjacent the other end thereof to the piston of said cylinder.

8. In a brake arrangement, the combination of a truck frame including a side frame, a wheel disposed adjacent thereto, brake rigging cooperating for braking association with said wheel, operating means for operating said brake rigging, said operating means including a cylinder supported by said truck frame, and a substantially horizontally disposed cylinder lever connected intermediate the ends thereof to said brake rigging, said cylinder lever being pivotally mounted adjacent one end thereof to a fixed pivot provided on said side frame, and pivotally connected adjacent the other end thereof to the position of said cylinder.

9. In a brake arrangement, the combination of a truck frame including a side frame, a wheel disposed adjacent thereto, brake rigging cooperating for braking association with said wheel, operating means for operating said brake rigging, said operating means including a horizontally disposed cylinder supported by said truck frame, and a cylinder lever connected intermediate the ends thereof to said brake rigging, said cylinder lever being pivotally mounted adjacent one end thereof on said side frame, and pivotally connected adjacent the other end thereof to the piston of said cylinder.

10. In a brake arrangement, the combination of a truck frame including a side frame, a wheel disposed adjacent thereto, brake rigging cooperating for braking association with said wheel, operating means for operating said brake rigging, said operating means including a horizontally disposed cylinder supported by said truck frame, and a cylinder lever connected intermediate the ends thereof to said brake rigging, said cylinder lever being pivotally mounted adjacent one end thereof to a fixed pivot provided on said side frame, and pivotally connected adjacent the other end thereof to the piston of said cylinder.

11. In a brake arrangement, the combination of a truck frame including a side frame, a wheel disposed adjacent thereto, brake rigging cooperating for braking association with said wheel, operating means for operating said brake rigging, said operating means including a horizontally disposed cylinder supported by said truck frame, and a substantially horizontally disposed cylinder lever connected intermediate the ends thereof to said brake rigging, said cylinder lever being pivotally mounted adjacent one end thereof on said side frame, and pivotally connected adjacent the other end thereof to the piston of said cylinder.

12. In a brake arrangement, the combination of a truck frame including a side frame, a wheel disposed adjacent thereto, brake rigging cooperating for braking association with said wheel, operating means for operating said brake rigging, said operating means including a horizontally disposed cylinder supported by said truck frame, and a substantially horizontally disposed cylinder lever connected intermediate the ends thereof to said brake rigging, said cylinder lever being pivotally mounted adjacent one end thereof to a fixed pivot provided on said side frame, and pivotally connected adjacent the other end thereof to the piston of said cylinder.

13. In a brake arrangement, the combination of a truck frame including a side frame, a wheel disposed adjacent thereto, brake rigging cooperating for braking association with said wheel, operating means for operating said brake rigging, said operating means including a cylinder mounted on said truck frame and disposed adjacent one side of said truck frame, said cylinder having a piston operable longitudinally of said truck frame, and a cylinder lever connected intermediate the ends thereof to said brake rigging, said cylinder lever being pivotally mounted adjacent one end thereof on said side frame, and pivotally connected adjacent the other end thereof to the piston of said cylinder.

14. In a brake arrangement, the combination of a truck frame including a side frame, a wheel disposed adjacent thereto, brake rigging cooperating for braking association with said wheel, operating means for operating said brake rigging, said operating means including a cylinder mounted on said truck frame and disposed adjacent one side of said truck frame, said cylinder having a piston operable longitudinally of said truck frame, and a cylinder lever connected intermediate the ends thereof to said brake rigging, said cylinder lever being pivotally mounted adjacent one end thereof to a fixed pivot provided on said side frame, and pivotally connected adjacent the other end thereof to the piston of said cylinder.

15. In a brake arrangement, the combination of a truck frame including a side frame, a wheel disposed adjacent thereto, brake rigging cooperating for braking association with with said wheel, operating means for operating said brake rigging, said operating means including a cylinder mounted on said truck frame, said cylinder having a piston operable longitudinally of said truck frame, and a substantially horizontally disposed cylinder lever connected intermediate the ends thereof to said brake rigging, said cylinder lever being pivotally mounted adjacent one end thereof on said side frame, and pivotally connected adjacent the other end thereof to the piston of said cylinder.

16. In a brake arrangement, the combination of a truck frame including a side frame, a wheel disposed adjacent thereto, brake rigging cooperating for braking association with said wheel, operating means for operating said brake rigring, said operating means including a cylinder mounted on said truck frame, said cylinder having a piston operable in the general direction of extension of said side frame, and a substantially horizontally disposed cylinder lever connected intermediate the ends thereof to said brake rigging, said cylinder lever being pivotally mounted adjacent one end thereof to a fixed pivot provided on said side frame, and pivotally connected adjacent the other end thereof to the piston of said cylinder.

17. In a brake arrangement, the combination of a truck frame including a side frame, a wheel disposed adjacent thereto, brake rigging cooperating for braking association with said wheel, operating means for operating said brake rigging, said operating means including a horizontally disposed cylinder mounted on said truck frame, said cylinder having a piston operable in the general direction of extension of said side frame, and a substantially horizontally disposed cylinder lever connected intermediate the ends thereof to said brake rigging, said cylinder lever being pivotally mounted adjacent one end thereof on said side frame, and pivotally connected adjacent the other end thereof to the piston of said cylinder.

18. In a brake arrangement, the combination of a truck frame including a side frame, a wheel disposed adjacent thereto, brake rigging cooperating for braking association with said wheel, operating means for operating said brake rigging, said operating means including a horizontally disposed cylinder mounted on said truck frame and disposed adjacent one side of said truck frame, said cylinder having a piston operable in the general direction of extension of said side frame, and a substantially horizontally disposed cylinder lever connected intermediate the ends thereof to said brake rigging, said cylinder lever being pivotally mounted adjacent one end thereof to a fixed pivot provided on said side frame, and pivotally connected adjacent the other end thereof to the piston of said cylinder.

19. In a brake arrangement, the combination of a truck frame including a side frame, a wheel disposed adjacent thereto, brake rigging cooperating for braking association with said wheel, operating means for operating said brake rigging, said operating means including a horizontally disposed cylinder mounted on said truck frame and disposed adjacent one side of said truck frame, said cylinder having a piston operable in the general direction of extension of said side frame, and a substantially horizontally disposed cylinder lever connected intermediate the ends thereof to said brake rigging, said cylinder lever being pivotally mounted adjacent one end thereof to a fixed pivot provided on said side frame, and pivotally connected adjacent the other end thereof to the piston of said cylinder.

20. In a brake arrangement, the combination of a truck frame including a side frame and truck frame members, a wheel disposed adjacent thereto, brake rigging cooperating for braking association with said wheel, operating means for operating said brake rigging, said operating means including a cylinder supported on one of said truck frame members, and a cylinder lever connected intermediate the ends thereof to said brake rigging, said cylinder lever being pivotally mounted adjacent one end thereof to a fixed pivot provided on another of said truck frame members, and pivotally connected adjacent the other end thereof to the piston of said cylinder.

ELMER LATSHAW.